UNITED STATES PATENT OFFICE.

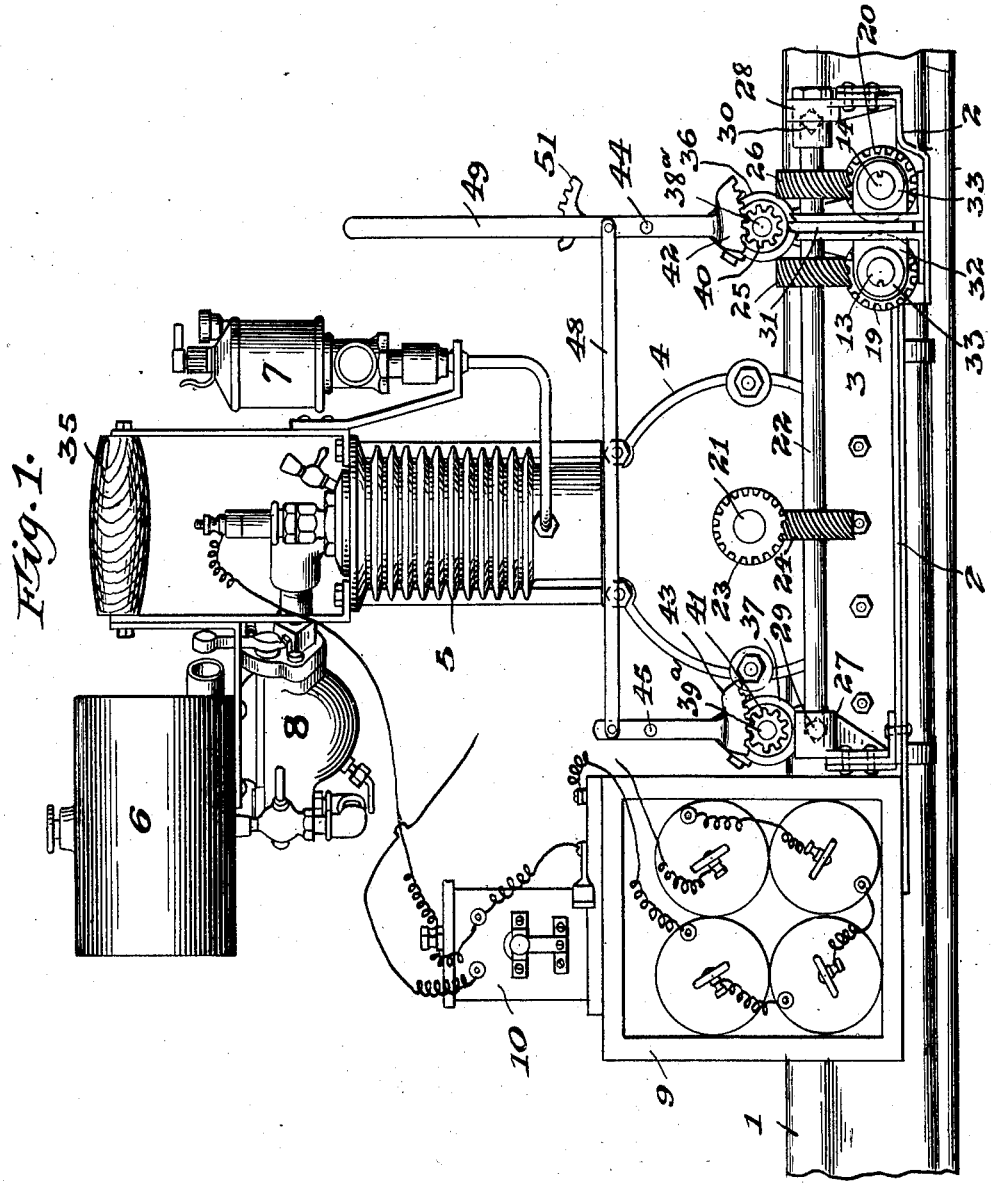

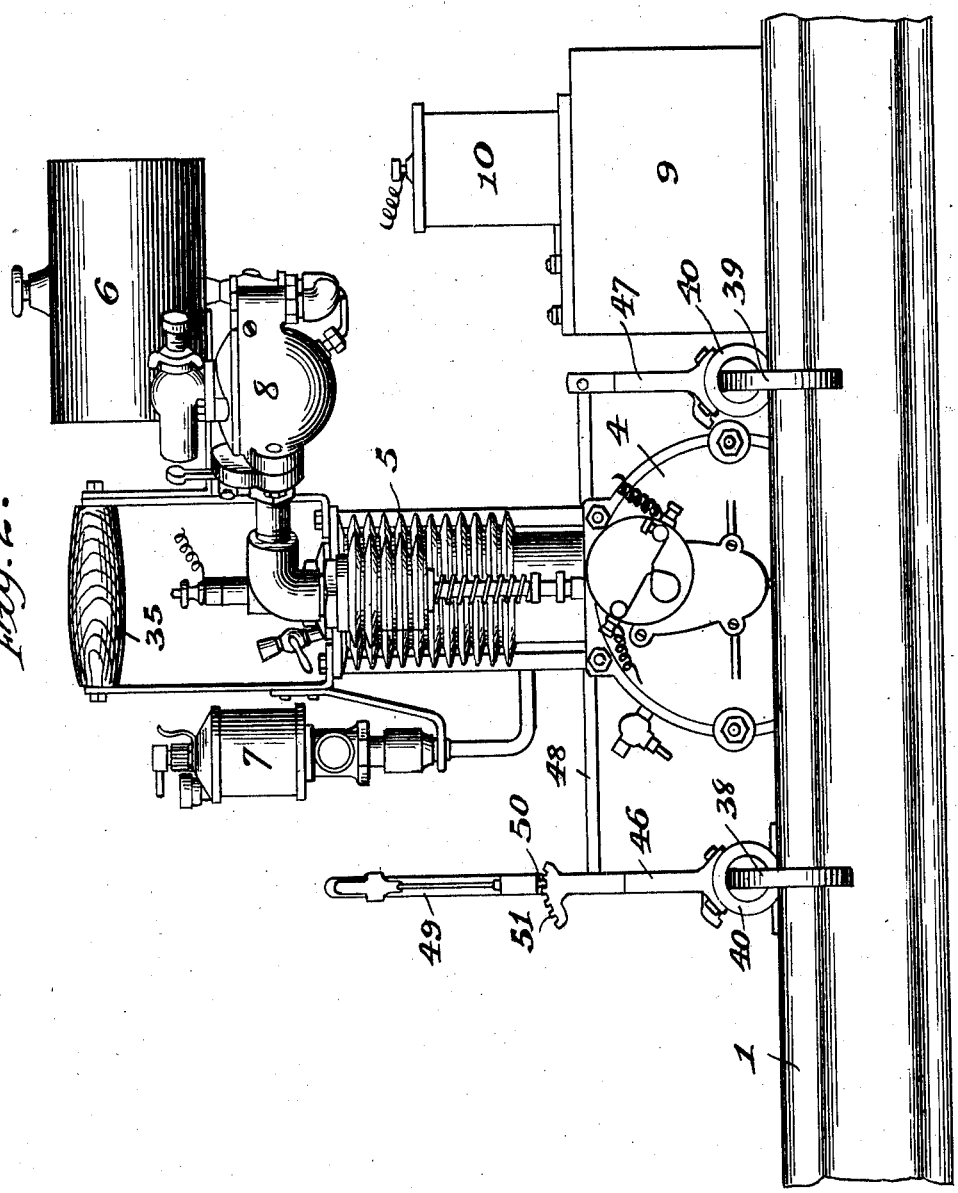

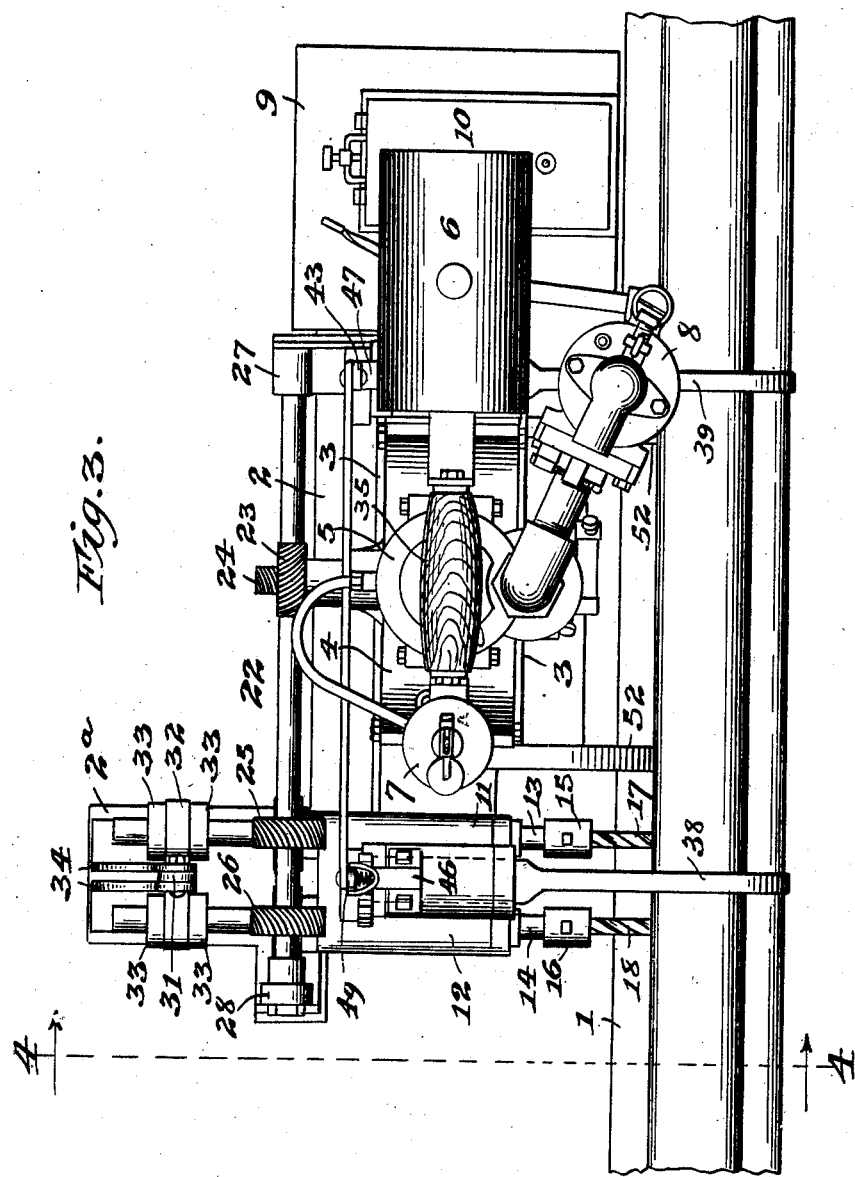

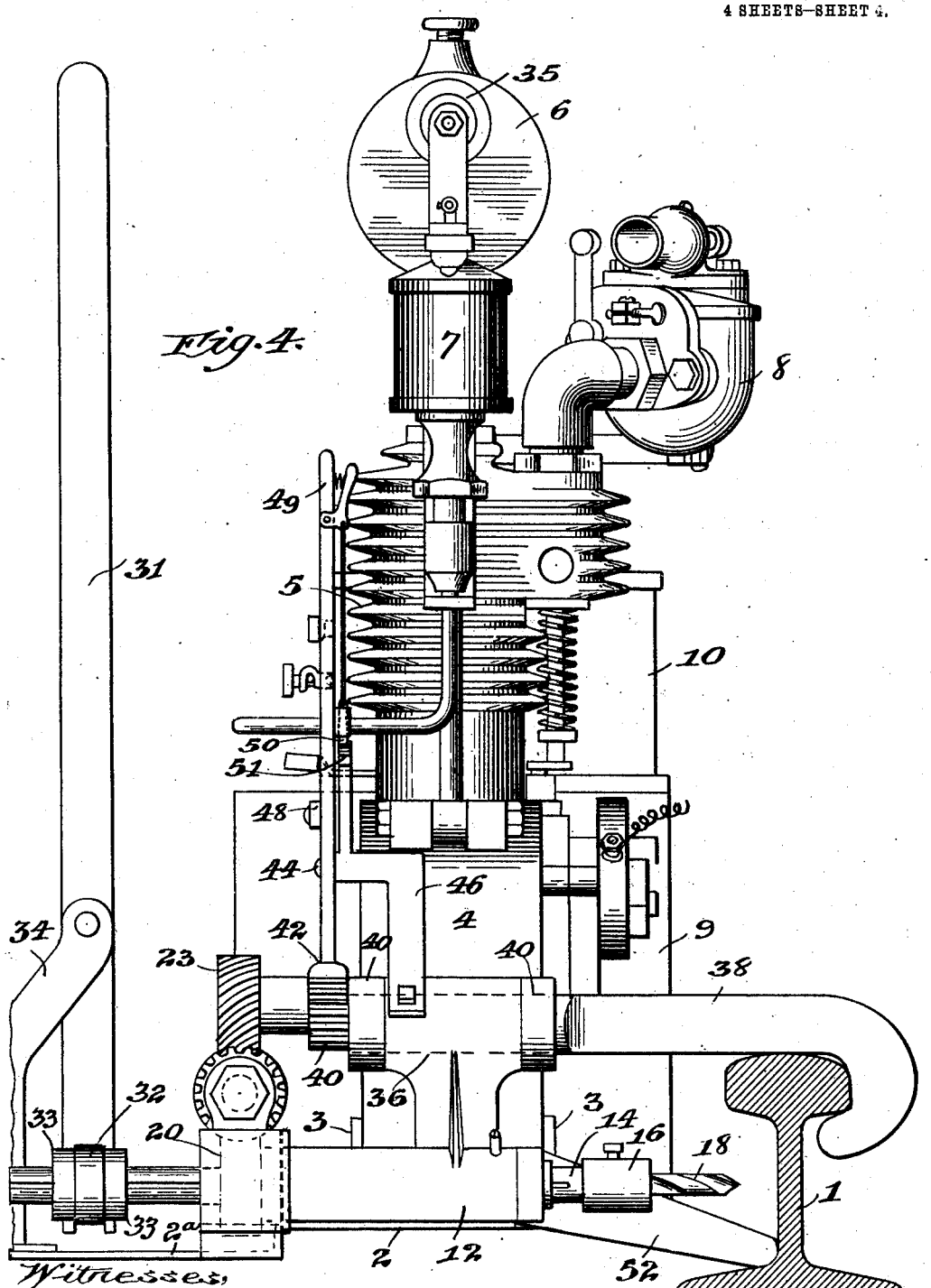

ALBERT S. EDLER, OF CHICAGO, ILLINOIS.

PORTABLE POWER-OPERATED DRILL.

972,351.

Specification of Letters Patent. Patented Oct. 11, 1910.

Application filed January 3, 1910. Serial No. 536,204.

*To all whom it may concern:*

Be it known that I, ALBERT S. EDLER, a citizen of the United States, residing at Chicago, in the county of Cook and State of Illinois, have invented certain new and useful Improvements in Portable Power-Operated Drills, of which the following is a specification.

This invention relates to the art of drilling machines, and has reference more especially to a new and improved machine for drilling holes in railroad rails for the application of rail bonding pins. Rail bonds are necessarily applied to the rails of railway tracks after the latter have been laid; and for the most part the drilling of the holes in the rails to receive the bonding pins is also done after the rails are laid. Hence arises the desirability of an efficient and practical means for preparing the rails for the reception of the bonding devices; and the chief object of the present invention is to provide a simple, efficient, portable, power operated machine for drilling holes in the rails, especially railway track rails, which shall be practicable for use on busy tracks by reason of its portable character and the facility and rapidity with which it may be applied to and removed from the rail.
A further object of the invention is to provide a machine of the character specified wherein, by the mere application of the machine to the rail, the drill spindle shall be accurately centered to its work and maintained in rigid and true alinement during the drilling operation.

As a still further feature of improvement, the present invention contemplates the employment, preferably, of a self-contained motor on the drilling machine, which shall dispense with the necessity of pneumatic, electric, or other like connections to a more or less remote source of motive power, which connections necessarily limit and circumscribe the sphere of action of the machine, besides being more or less in the way.

To these and other minor ends, the invention consists in a power operated rail drill employing a self-contained motor and possessing the novel and peculiar features of construction and mode of operation substantially as hereinafter described and more particularly pointed out and defined in the appended claims.

My invention, its mode of use, and the advantages secured thereby, will be readily understood when considered in connection with the accompanying drawings and the following detailed description thereof; said drawings illustrating one practical mechanical form in which the principle of the invention may be embodied and wherein—

Figure 1 is a side elevation view, partly broken away, of the complete machine as applied to the rail of a railway track. Fig. 2 is a similar view from the opposite side of the machine. Fig. 3 is a top plan view. Fig. 4 is an end elevation, somewhat enlarged, in cross section through the rail on the line 4—4 of Fig. 3.

The machine of the invention is adapted to drill holes in any kind or class of structural steel bars or rails; but in the accompanying drawings I have illustrated the machine in connection with its chief intended application, which is that of a handy railway track appliance for drilling the rails of the track preliminary to bonding.

Referring, then, to the drawings, 1 designates a track rail on which the apparatus is mounted and wholly supported and upon which it is designed to operate.

2 designates as an entirety a low frame or platform on which are rigidly secured a pair of parallel low frame plates 3 to and between which is rigidly secured the crank chamber 4 of a small portable gasolene engine, the power cylinder whereof is designated by 5. With the specific construction of this engine my present invention is not concerned, and it will suffice to mention that it is equipped with all of the usual and necessary engine accessories, such as a gasolene tank 6, lubricating oil holder 7, carbureter 8, battery holder 9, spark coil 10, etc., to render it a self-contained and complete generator of sufficient power to operate the drill or drills.

Mounted in journal bearings 11 and 12 rigid with and disposed transversely of one end of the frame plate 2 are spindles 13 and 14 carrying chucks 15 and 16 respectively adapted to receive a pair of drill-bits 17 and 18; said spindles being so located as to present the points of the bits to the web of the rail at the desired height of location of the holes to be drilled in the latter. The spindles 13 and 14, on the opposite sides of the bearings 11 and 12, have splined thereon skew or spiral gears 19 and 20 (Fig. 1), which are driven from the crank shaft 21 of the engine through interposed gearing herein shown as comprising a transmission shaft 22, spiral gears 23 and 24 on the engine and transmission shafts, respectively, and spiral gears 25 and 26 engaging and driving the spiral gears 19 and 20, respectively, all as clearly shown in Fig. 1. The transmission shaft 22 is journaled at its ends in bearing brackets 27 and 28, which brackets are rigidly secured to over-lapped and riveted end portions of the frame members 2 and 3, as clearly shown in Fig. 1. The spiral type of transmission gearing herein shown occasions considerable end thrust upon the transmission shaft 22; and the friction and drag consequent thereupon is largely reduced by the interposition of anti-friction end bearings herein shown as consisting of balls 29 and 30 (Fig. 1) carried by the bearing brackets 27 and 28 and engaging the concaved ends of the shaft 22.

In order to move the drill bits 17 and 18 endwise toward and from the work, I provide a manually operated device herein shown as comprising a hand lever 31 (Fig. 4) that is connected at its lower end to a cross head 32, this latter being apertured to loosely fit the outer end portions of the spindles 13 and 14, said cross head being confined adjustably on said spindles by clamping collars 33. The hand lever 31 may be fulcrumed at any suitable point of support, being herein shown as fulcrumed between the upper ends of a pair of upright brackets 34 secured to a downwardly and laterally off-set extension 2ª of the base frame 2.

To render the device conveniently portable, I attach to the upper end of the engine cylinder a bail-shaped handle 35 which occupies a substantially central position relative to the distribution of weight of the complete machine.

The machine proper is provided with means whereby it may be securely mounted upon and supported wholly on and to one side of the rail to be drilled, and in such a manner that the spindle is automatically accurately centered to its work and maintained rigidly in such centered position during the drilling operation, these means comprising the following instrumentalities: Rigidly mounted on the bearing sleeves 11 and 12 at one end of the machine frame and on the base frame 2 near the opposite end are bearing brackets 36 and 37, the upper portions of which are formed as journals to receive the circular stems or shanks of a pair of hook-shaped tension links 38 and 39; the shanks of said links being fitted with collars 40 opposite the ends of each bearing to confine the link against endwise movement, and on the inner reduced ends 38ª and 39ª (Fig. 1) of said tension links are secured pinions 40 and 41. These pinions are engaged by segment racks 42 and 43, respectively, the arms of which are pivoted at 44 and 45 to brackets 46 and 47 rigidly mounted on the bearing brackets 36 and 37, respectively. The arms of said segment racks are connected to operate in unison by the cross link 48, and the arm of the segment rack 42 is continued upwardly to form an operating arm or handle 49, this latter being provided with the usual spring actuated dog 50 (Figs. 2 and 4) coöperating with a rigid segment rack 51 rising from the bracket 46. The hooked ends of the tension-links 38 and 39 engage the head or tread of the rail 1 in the manner clearly shown and constitute the tension supports, coöperating with struts or braces 52 which project rigidly laterally and downwardly from the base frame 2 and at their free ends bear against the rail at the angle formed between the web and base thereof.

In operation, when the machine is to be applied to a rail to be bored, the handle 49 is released from its locking segment 51 and swung to the right, from the position shown in Fig. 1, whereby the hook ends of the tension links 38 and 39 are turned upwardly into a horizontal plane. The free ends of the struts 52 are then brought to a bearing against the lower angle of the rail, the whole machine is tilted on the points of the struts toward the rail until the tips of the hooks have cleared the opposite edge of the head of the rail, and the handle 49 is then swung back to vertical position, which rotates the hooks downwardly through a right-angle, and by then releasing the hold upon the handle 35, the weight of the machine causes the hooks to move into operative engagement with the head of the rail, as shown in Fig. 4, and the machine is then ready for work. The engine having been started, a high speed of rotation is imparted to the drills; and by proper manipulation of the lever 31 the operator forces the drill bits to the work with whatever degree of pressure is practicable.

To remove the machine it is necessary only to retract the drills by the lever 31, tilt the machine on the struts 52 toward the rail until the hooks have cleared the head of the latter, then rotate the hooks back into the horizontal plane by the lever 49, and lift the machine off the track, which operations require but a few seconds of time, thereby well adapting the machine for use on busy tracks, where the only opportunities for work are between trains passing in close succession and it is essential to rapidly apply the machine to and remove it from the rail to accomplish the work and avoid danger of accident.

The spiral gear driving connections herein shown and described between the motor shaft and the drill spindles are peculiarly adapted for such a machine as I have described as they are very positive in action, present a minimum of lost motion, occupy but little space, and generally combine a high degree of efficiency with a minimum of weight, which is important, since any feature which reduces weight without loss of strength and efficiency, enhances the portability of the machine and thus contributes to the main purpose or object of the invention, namely, the production of a readily portable power operated rail drill, as distinguished from manually operated drills, and from power operated drills of such size and weight as to require the combined efforts of a number of section hands to apply and remove them.

It will thus be seen that in the machine of my invention I have combined the convenience and ready portability of manually operated drills with the speed of and high efficiency and accuracy of power operated drills, eliminating the slowness and inaccuracy of a hand drill and the cumbersomeness of the power drill.

I claim:—

1. In a portable rail-drill of the character described, the combination with a frame, of means for detachably mounting and supporting the same in working position wholly on a rail to be drilled, a self-contained motor mounted on said frame, a drill-spindle mounted in said frame parallel with the driving-shaft of said motor, a horizontal transmission-shaft having anti-friction end-thrust bearings journaled at its ends on said frame between and at right angles to the driving-shaft of said motor and said drill-spindle, intermeshing spiral gears on said motor-shaft and transmission-shaft and on the latter and said drill-spindle, respectively, and means for forcing said drill-spindle toward the rail, substantially as described.

2. In a portable rail-drill of the character described, the combination with a frame comprising a horizontal base-plate and parallel upright frame-plates thereon, of a vertical gas-engine having its crank chamber rigidly secured to and between said upright frame-plates and its shaft disposed transversely of the latter, a drill-spindle journaled in and transversely of one end of said frame, an intermediate horizontal transmission-shaft geared to the shaft of said engine and to said drill-spindle, means for moving said drill-spindle lengthwise toward and from the rail, and means for detachably mounting the said frame in working position on and to one side of the rail, substantially as described.

3. In a portable rail-drill of the character described, the combination with a frame, of a vertical gas-engine having its crank-chamber mounted on and rigidly secured to said frame, a drill-spindle journaled in and transversely of one end of said frame, an intermediate horizontal transmission-shaft geared to the shaft of said engine and said drill-spindle, means for forcing said drill-spindle toward and from the rail, rail-gripping devices brought into action by the weight of the drill for detachably securing the latter in working position on and to one side of the rail, and a lifting-handle attached to the upper end of the engine cylinder, substantially as described.

4. In a portable rail-drill of the character described, the combination with a frame, of a drill-spindle journaled therein, a motor mounted on said frame and geared to said drill-spindle, means for moving said drill-spindle lengthwise toward and from the rail, and means for detachably mounting and supporting said frame on and to one side of the rail, comprising tension-links rotatably mounted in said frame and having hook-shaped ends adapted to engage the head of the rail and struts projecting from said frame and adapted to abut at their free ends against the rail below the head thereof, substantially as described.

5. In a portable rail-drill of the character described, the combination with a frame, of a drill-spindle journaled therein, a motor mounted on said frame and geared to said drill-spindle, means for moving said drill-spindle lengthwise toward and from the rail, and means for detachably mounting and supporting said frame on and to one side of the rail, comprising a pair of tension-links journaled transversely of said frame and formed with hook-shaped ends adapted to engage the head of the rail, means for simultaneously rotating said tension-links and struts rigid with and projecting laterally from said frame and adapted to abut at their free end against the rail below the head thereof, substantially as described.

6. In a portable rail-drill of the character described, the combination with a frame, of a drill-spindle journaled therein, a motor mounted on said frame and geared to said drill-spindle, means for moving said drill-spindle lengthwise toward and from the rail, and means for detachably mounting and supporting said frame on and to one side of the rail, comprising a pair of parallel tension-links journaled transversely of said frame and formed with hook-shaped ends adapted to engage the head of the rail, pinions on the opposite ends of said links, pivoted segment racks engaging said pinions, a connection between said segment racks whereby they are caused to operate in unison, an operating handle for said segment racks, and struts rigid with and projecting laterally from said frame and adapted to abut against the rail at the angle formed between the web and base thereof, substantially as described.

ALBERT S. EDLER.

Witnesses:
SAMUEL N. POND,
LOIS FORCE.